United States Patent [19]
Hackney

[11] Patent Number: 4,497,642
[45] Date of Patent: Feb. 5, 1985

[54] FILTER ASSEMBLY

[75] Inventor: Stanley Hackney, Warrington, England

[73] Assignee: United Kingdom Atomic Energy Authority, London, England

[21] Appl. No.: 507,598

[22] Filed: Jun. 24, 1983

[30] Foreign Application Priority Data

Jul. 7, 1982 [GB] United Kingdom ................ 8219686

[51] Int. Cl.$^3$ ............................................ B01D 46/00

[52] U.S. Cl. ....................................... 55/422; 55/481; 55/483; 55/502; 55/DIG. 9

[58] Field of Search .................. 55/422, 483, 478–481, 55/484, 502, DIG. 9, DIG. 29; 376/313, 314

[56] References Cited

U.S. PATENT DOCUMENTS 3,354,616 11/1967 Lucas .................................... 55/96
3,880,625 4/1975 Shook ............................... 55/502 X
4,198,221 4/1980 Catlin et al. .......................... 55/481
4,266,955 5/1981 Hackney .......................... 55/502 X Primary Examiner—Charles N. Hart
Attorney, Agent, or Firm—William R. Hinds

[57] ABSTRACT

A plurality of individual filters extend in line across a duct for a gas flow and the duct can be located within secondary containment. The pressure of gas within the duct is less than external pressure and the filters can be supported by a guideway which extends across the duct between opposing walls of the secondary containment with the interior of the guideway communicating with the secondary containment to provide an inward flow purge. The filters in the line are replaced individually by inserting a replacement filter into the line at one end and retrieving the displaced filter at the opposite end of the line.

8 Claims, 5 Drawing Figures

FILTER ASSEMBLY

The present invention concerns a filter assembly.

BACKGROUND OF THE INVENTION

The treatment of radioactive gas flows in nuclear plants requires rigorous control and safety standards. It is necessary to design against leakage when dealing with components, such as filters, which require periodic replacement. At the same time it is required to replace filters without isolating the plant and without loss of filtration efficiency during the replacement operation.

FEATURES AND ASPECTS OF THE INVENTION

According to the present invention a filter assembly comprises a pack of individual filters movable in line across a duct for gas to be filtered, normally closed access means at opposite ends of the line movable to permit entry and removal of the filters, means for introducing purge gas between opposing faces of adjacent filters in the line and to the ends of the line at the access means, the purge gas being at a pressure greater than the pressure in the duct such that the purge gas flows into the duct and opposes the entry of the gas being filtered between the filters and opposes the escape of the gas at the ends of the line upon opening of the access means to permit access to the filters.

The purge gas can be at ambient pressure with the pressure within the duct at sub-ambient levels. For filtering a gas flow contaminated with radioactive or other toxic matter it is required to ensure that no escape of gas occurs both in operation and during replacement of the filters in the pack. The duct can be located within an enclosure having walls of a shielding material and forming a secondary containment at ambient pressure about the duct. The filters can be supported within a guideway extending across the duct between opposing walls of the secondary containment the interior of the guideway communicating with the secondary containment whereby to enable a purge flow to pass into the guideway, between opposing faces of adjacent filters and to emerge into the gas flow along the duct. The filters in the line can be replaced individually by inserting a replacement filter into the line at one end and retrieving the displaced filter at the opposite end of the line. The access means to the line can be slide doors mounted on the exterior of the shielding wall and the filters can be introduced into and received from the line by posting flasks cooperable with the slide doors. The interior of the posting flask is maintained at ambient pressure to permit an inward purge flow from the flask and about the filter emerging from or entering into the flask to oppose escape of contaminated flow from the duct which is at sub-ambient pressure.

DESCRIPTION OF THE DRAWINGS

The invention will be described further, by way of example, with reference to the accompanying diagrammatic drawings; in which.

DESCRIPTION OF THE PREFERRED EMBODIMENT

Figure 1:
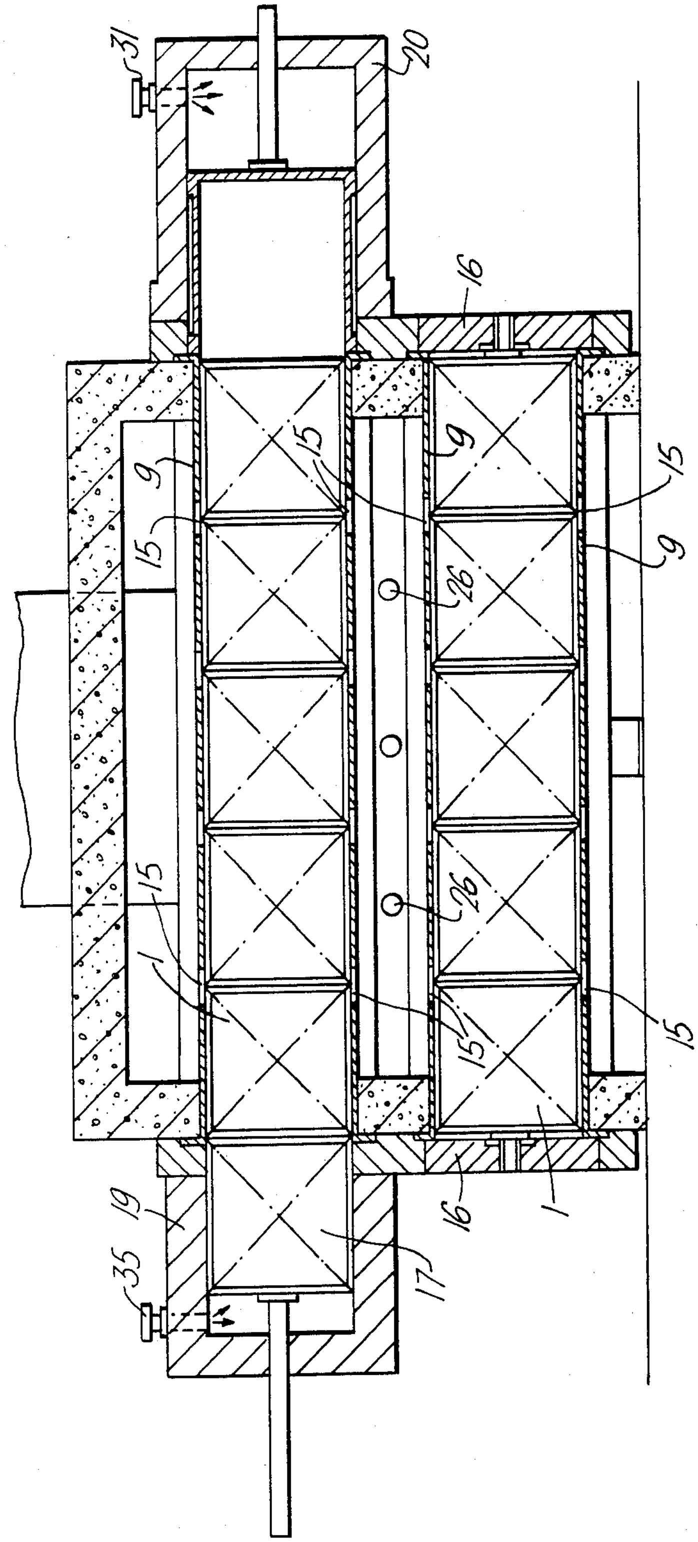
FIG. 1 is a sectional elevation of a filter assembly having two banks of filters, each bank comprising five filters in abutting arrangement.

In the drawings, two banks of filters with each bank comprising five individual rectangular filters 1 arranged in edge-to-edge abutment extend across a flow channel for air (or gas) to be filtered. An inlet duct 3 conveys air (or gas) to be filtered to a chamber 4 at one side of the banks of filters. An outlet duct 5 for filtered air (or gas) leads from a chamber 6 at the opposite side of the banks of filters. The filter assembly is located within a secondary containment being an enclosure 7 bounded by walls 8 of a material such as concrete capable of serving as a radioactive and biological shield.

Figure 2:
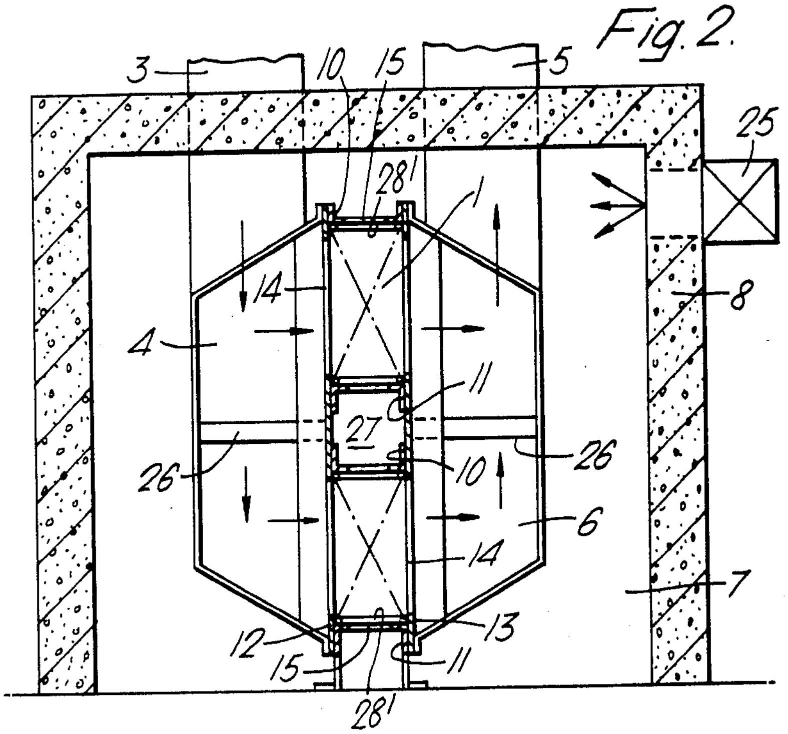
FIG. 2 is a section normal to FIG. 1.

The filters of each bank are a close fit and slidable within respective rectangular guideways 9 which extend across the enclosure 7 between opposite walls thereof. The guideways 9 can be formed from steel channel shaped members. As shown in FIG. 2, upper and lower channel-shaped members 10 and 11 form the roof and floor respectively of each guideway. The opposing side walls of the guideway are formed by respective members 12 and 13. Openings 14 in the side walls permit the passage of air (or gas) from the chamber 4 through the filters and into the chamber 6 as indicated by the arrows in FIG. 2. Openings 15 are additionally provided in the roof and floor of the guideway, these openings, for example slots, being located to coincide with the edges of adjacent filters when the filter pack is located in position between the chambers 4 and 6 and as shown in FIG. 1. Slidable shield doors 16 are mounted on the exterior of the walls 8 at the ends of the guideways. The doors serve to close the ends of the guideways and as shown at the lower bank of filters in FIG. 1.

The filters in each bank can be replaced individually by inserting a fresh filter at one end of the guideway to thereby displace the filter at the opposite end of the guideway. This is shown in FIGS. 1 and 3 where in FIG. 1 a replacement filter 17 at the left hand end of the bank is being presented for insertion into the guideway and in FIG. 3 where the replacement filter 17 is in a partly inserted position and filter 18 at the opposite end of the bank is partly displaced out of the guideway.

The replacement filter 17 is contained within a posting flask 19 which is presented to the closed door at the left hand end of the guideway. The door 16 is then moved by sliding to one side to gain access to the end of the guideway. Similarly, the door 16 at the opposite end of the guideway is opened after locating in position a posting flask 20 to receive the filter 18. The posting flask 20 is provided with a slide door or lid 21 and contains a posting box 22. After moving the lid 21 to open the flask 20 the posting box 22 is pushed to emerge partly from the flask such that the leading end of the box 22 abuts against the end of the guideway and as shown in FIG. 3. The box can be ejected from the flask and held in tight abutment against the end of the guideway by means of a plunger 23 or the like as depicted in FIG. 3.

Figure 3:
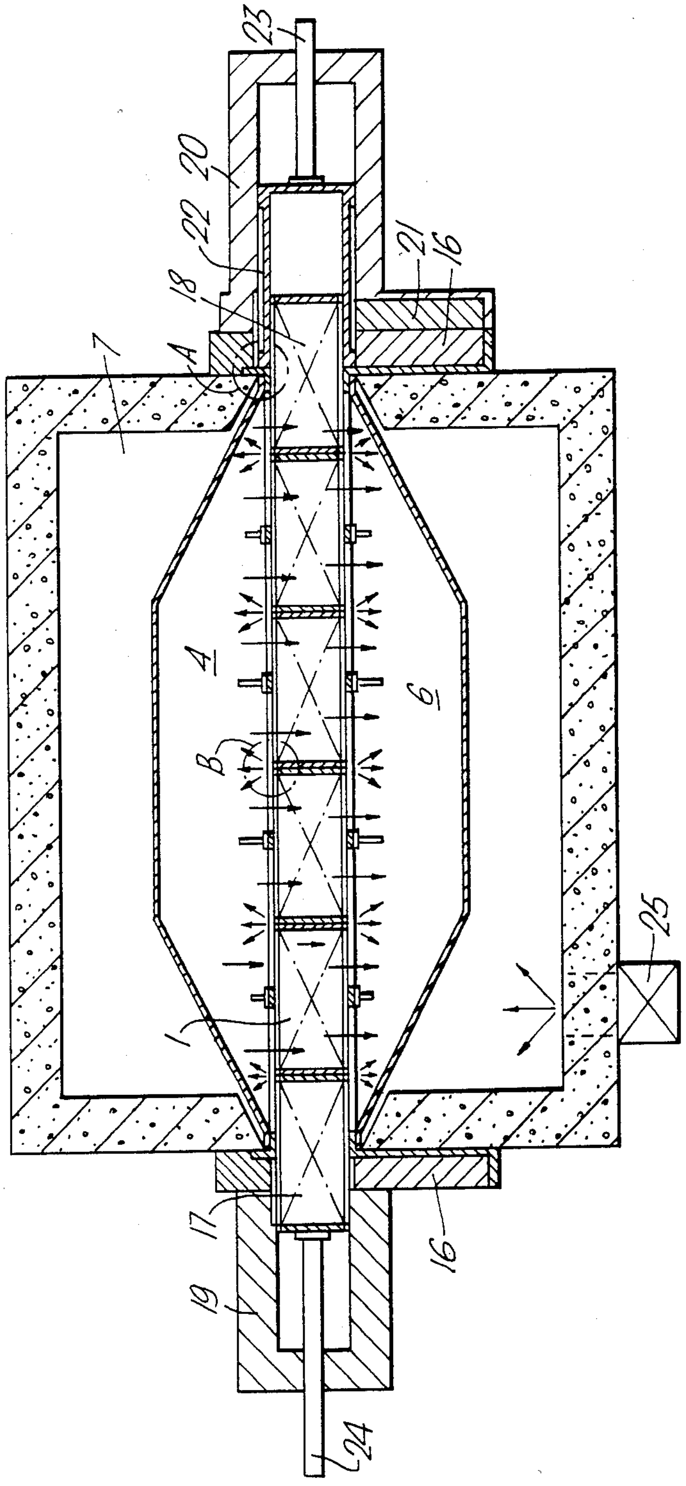
FIG. 3 is a plan in section of FIG. 1 and showing the introduction and removal of filters.

The replacement filter 17 is then displaced to the right in FIGS. 1 and 3 by means of a plunger 24 or the like to enter the guideway and to displace the bank of filters. The filter 18 is pushed into the posting box 22. With the replacement filter 17 fully inserted, the filter 18, which frictionally engages the box 22, is pulled away from the guideway by withdrawal of the box into the posting flask 20. The door 16 at the end of the guideway and the lid 21 are then closed and the flask 20 is removed for disposal of the filter 18 at a suitable location. The procedure is repeated in turn for each of the five filters in the bank to obtain a new bank of clean filters.

When filtering air (or gas) which is contaminated with radioactive or other hazardous matter it is essential to maintain the integrity of the assembly at all times and that no leakage or escape occurs during replacement of the filters. This is achieved by air purge flows.

The inlet pressure in the chamber 4 and the outlet pressure in the chamber 6 are both kept below the pressure within the enclosure 7 bounded by the shielding. For example, the pressure within the enclosure 7 can be atmospheric (0 cms water gauge), the pressure in the chamber 4 can be −10 cms water gauge and that in the chamber 6 can be −13 cms water gauge. An air inlet filter 25 is provided in a wall of the enclosure 7 to provide communication between the outside atmosphere and the enclosure.

Tubes 26 pass through the chambers 4 and 6 providing communication between the enclosure 7 and a compartment 27 between the two banks of filters and extending between the opposite side walls of the enclosure. Consequently this compartment 27 is at the same pressure as the pressure within the enclosure 7, i.e. at atmospheric pressure. Preferably, the slots or openings 15 in the roof and floor of the guideway are so arranged that when the filters are in position in the guideway the opposing edge faces of adjacent filters in the bank are aligned with the slots or openings 15. Consequently the gaps 28 between adjacent filters are at atmospheric pressure and a purge flow can issue from the gaps 28 into the compartments 4 and 6. The flow into the compartment 4 acts to oppose flow from the compartment 4 entering the gaps and thereby bypassing the filters. When the filters are at any intermediate position during replacement and renewal the gaps 28 are supplied with purge flow from the compartment 27 and the slots 15 via gaps 28′ between the individual filters and the roof and floor of the guideway. Such gaps 28′ are shown in FIG. 2 only.

FIG. **4*b* shows in enlarged detail the gap 28 between two adjacent filters 1 in the bank. This figure also shows a flexible seal 29 about the frame 30 of each filter and which engages the channel-shaped members of the guideways. The seals 29** can be coated or covered with a material such as fibre glass which is wear-resistant and to reduce friction at the guideways.

Figure 4A:
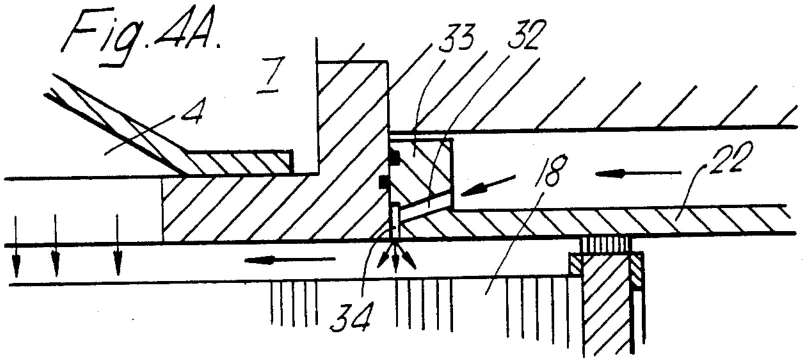
FIGS. 4*a* and 4*b* are details of encircled portions A and B respectively in FIG. 3.
Figure 4B:
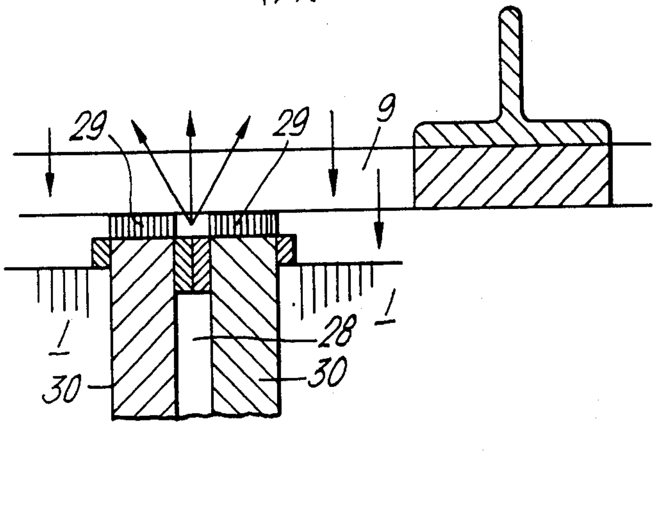

A further air purge is provided about the filter 18 being displaced into the posting box 22. A purge air inlet filter 31 is provided in the wall of the flask 20 and as shown in FIG. **4*a* a narrow passage 32 through the flange 33 at the open end of the posting box 22 communicates with an annular groove 34 in the end face of the flange 33, the groove 34 opening into the interior of the box and hence the region about the filter 18 being introduced into the box and communicating with the chambers 4 and 6. Consequently there is an inward flow of purge air in the direction indicated by the arrows in FIG. 4*a* from ambient pressure within the posting flask 20 to sub-ambient pressures within the chambers 4 and 6. This air purge opposes the entry of contaminated air (or gas) from the chambers into the posting box 22 and prevents contamination of sealing surfaces external to the containment. The posting flask 19 is likewise provided with an air inlet filter 35 so that the interior of the flask is at axbient atmospheric pressure during the loading of a replacement filter and as a result any flow is from the interior of the flask into the compartments 4 and 6**.

The purge flows maintain the integrity of the assembly during operation and during the replacement and renewal of filters. It will be appreciated that a filter assembly can comprise a single bank of individual filters or a plurality of such banks and is not confined to two banks as shown in the drawings. Similarly, the number of individual filters in the or each bank can be a matter of choice.

I claim:

1. A filter assembly comprising a pack of individual filters movable in line across a duct for gas to be filtered, normally closed access means at opposite ends of the line movable to permit entry and removal of the filters, means for introducing purge gas between opposing faces of adjacent filters in the line and to the ends of the line at the access means, the purge gas being at a pressure greater than the pressure in the duct such that the purge gas flows into the duct and opposes entry of the gas being filtered between the opposing faces of adjacent filters in the line and opposes the escape of the gas being filtered at the ends of the line.

2. A filter assembly according to claim 1 in which the purge gas is at atmospheric pressure.

3. A filter assembly according to claim 1 including an enclosure having walls of a shielding material to form a secondary containment at atmospheric pressure about the duct.

4. A filter assembly according to claim 3 including a guideway extending across the duct between opposing side walls of the secondary containment to slidably receive the filters.

5. A filter assembly according to claim 4 including openings in the guideway to allow a purge flow to pass from the secondary containment into the guideway, between opposing faces of adjacent filters and into the gas flow through the duct.

6. A filter assembly according to claim 1 in which the access means at opposite ends of the line comprise slide doors.

7. A filter assembly according to claim 6 including posting flasks cooperable with the slide doors for the entry and removal of filters.

8. A filter assembly according to claim 7 including means for maintaining an inward purge flow at the posting flasks.

* * * * *